(12) United States Patent
Adi et al.

(10) Patent No.: US 7,996,354 B2
(45) Date of Patent: Aug. 9, 2011

(54) DEVICE, METHOD AND COMPUTER PROGRAM PRODUCT FOR EVALUATING A BEHAVIOR OF AN ENTITY

(75) Inventors: Asaf Adi, Qiryata Ata (IL); Gil Nechushtai, Atlit (IL); Guy Sharon, Rehovot (IL); Boris Shulman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 11/845,114

(22) Filed: Aug. 27, 2007

(65) Prior Publication Data

US 2009/0063380 A1 Mar. 5, 2009

(51) Int. Cl.
*G06F 15/00* (2006.01)
(52) U.S. Cl. ............... 706/62; 706/45; 706/46; 706/47; 706/48; 706/60
(58) Field of Classification Search .................. None
See application file for complete search history.

(56) References Cited

U.S. PATENT DOCUMENTS

| | | | |
|---|---|---|---|
| 6,604,093 B1 | 8/2003 | Etzion et al. | |
| 7,500,209 B2 * | 3/2009 | Raghavan et al. | 716/6 |
| 2005/0096966 A1 * | 5/2005 | Adi et al. | 705/10 |
| 2006/0229923 A1 | 10/2006 | Adi et al. | |
| 2007/0083352 A1 * | 4/2007 | Raghavan et al. | 703/16 |
| 2007/0118545 A1 * | 5/2007 | Chandrasekharan et al. | 707/101 |
| 2008/0059621 A1 * | 3/2008 | Raghavan et al. | 709/223 |
| 2008/0109824 A1 * | 5/2008 | Chen et al. | 719/318 |

OTHER PUBLICATIONS

Rizvi, "Complex Event Processing Beyond Active Databases: Streams and Uncertainties", Dec. 2005, pp. 1-44.*
Ferg, "Event-Driven Programming: Introduction, Tutorial, History", Feb. 2006, pp. 1-59.*
Adi et al., "Amit—The Situation Manager", The VLDB Journal, 2004, pp. 177-203.*
Lundberg, "Leverage Complex Event Processing to Improve Operational Performance", Business Intelligence Journal, Jun. 2006, pp. 55-65.*
S. Rizvin, "Complex Event Processing Beyond Active Databases: Streams and Uncertainties", Technical Reports, Dec. 16, 2005 [online] [retrieved May 17, 2007] http://www.eecs.berkeley.edu/Pubs/TechRpts/2005/EECS-2005-26.cdf, (entire document).
"Complex Event Processing: Ten Design Patterns", Coralis 2006; [online] [retrieved May 17, 2007] http://complexevents.com/2007/04/20/complex-event-processingten-design-patterns/ pp. 1-23.
Adi and Etzion, "AMiT—The situation manager", VLDB Journal 13(2), May 2004, 177-203.

* cited by examiner

*Primary Examiner* — Omar F Fernandez Rivas

(57) ABSTRACT

A method for evaluating a behavior of an entity, the method includes: converting a state machine representation of a behavior of an entity to a complex event processing (CEP) representation of the behavior of the entity; wherein the converting comprises defining a transition between multiple states of the state machine representation as a situation; and evaluating the behavior of the entity in response to the CEP representation.

20 Claims, 3 Drawing Sheets

DEVICE, METHOD AND COMPUTER PROGRAM PRODUCT FOR EVALUATING A BEHAVIOR OF AN ENTITY

FIELD OF THE INVENTION

The present invention relates to a method, a device and a computer program product for evaluating a behavior of an entity.

BACKGROUND OF THE INVENTION

A state machine is a model of a behavior of an entity that includes states, transitions between states and actions. An action can be performed when entering a state, when exiting a state, in response to a present state and input condition, or upon a certain transition.

A transition indicates a state change and is described by a condition that would need to be fulfilled to enable the transition.

Complex state machines can include complex transitions. A complex transition can be conditioned by an occurrence of multiple events, by multiple repetitions of an occurrence of a certain event and, additionally or alternatively, by one or more states (or transitions) of other state machines.

Using simple event driven models in order to evaluate a behavior of an entity (that is modeled by a complex state machine) is very problematic. It will require a definition of multiple dummy states that will dramatically increase the size and complexity of the simple event driven model. In addition, simple event driven models are not capable of expressing interactions between state machines, i.e., transitions based on states or transitions of other state machines. Prior art state machine representations are not capable of capturing a complex state machine (behavior of entities interacting with each other\mutually affecting each others state).

There is a need to provide efficient methods, systems and computer program products for efficiently evaluating a behavior of an entity.

SUMMARY OF THE PRESENT INVENTION

A method for evaluating a behavior of an entity, the method includes: converting a state machine representation of a behavior of an entity to a complex event processing (CEP) representation of the behavior of the entity; wherein the converting comprises defining a transition between multiple states of the state machine representation as a situation; and evaluating the behavior of the entity in response to the CEP representation.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

According to an embodiment of the invention a complex event processing (CEP) model is used in order to evaluate a behavior of an entity. A state machine representation of the behavior of the entity is either received, generated or updated. This state machine representation is converted to the CEP model. The CEP model is used to evaluate the behavior of that entity. The CEP model can be processed by a CEP engine that, in response to information representative of events, can evaluate the behavior of the entity. The CEP model can efficiently describe complex state machines.

Conveniently, transitions between states are defined as situations. When the state machine reaches a certain state an event is generated. This event initiates the life spans of one or more situations that represent possible transitions from the certain states to other states of the state machine. These situations can terminate if complex conditions are fulfilled and when the state machine transits to another state that can not reached from a previous state.

U.S. Pat. No. 6,604,093, whose disclosure is incorporated herein by reference, describes a situation management system that is referred to as a CEP engine. The CEP engine uses a language that enables complex events to be defined as the composition of multiple simple events. In addition, a particular order and other timing constraints on the component events may be specified. Once the complex event has been detected, there may be one or more conditions that qualify the event, for example, that the amounts of the withdrawals be greater than a specified threshold. If the conditions are satisfied, then an action is triggered. The patent defines a specified composition of events together with the conditions attached to these events as a "situation." The present patent application uses this definition, as well.

The CEP engine described in U.S. Pat. No. 6,604,093 provides tools for defining intervals during which a given situation is meaningful and for detecting and reacting to the occurrence of the situation during such intervals. An interval of this sort is referred to as a "lifespan." A lifespan begins with an initiating event, or initiator, and ends with a terminating event, or terminator. The situation management system enables manipulation of the initiator and terminator, such as by attachment of conditions to the initiating and terminating events. The situation management system also defines quantifiers, indicating how the system is to respond to repeated occurrences of a given event in a given lifespan.

Aspects of the CEP engine described in U.S. Pat. No. 6,604,093 are implemented in IBM Advanced Middleware Technology, a situation management tool (also known as AMiT) developed at IBM Haifa Research Laboratory (Haifa, Israel). AMiT is described in an article by Adi and Etzion entitled, "AMiT—the Situation Manager," VLDB Journal 13(2) (Springer-Verlag, May, 2004), pages 177-203, which is incorporated herein by reference.

Figure 1:
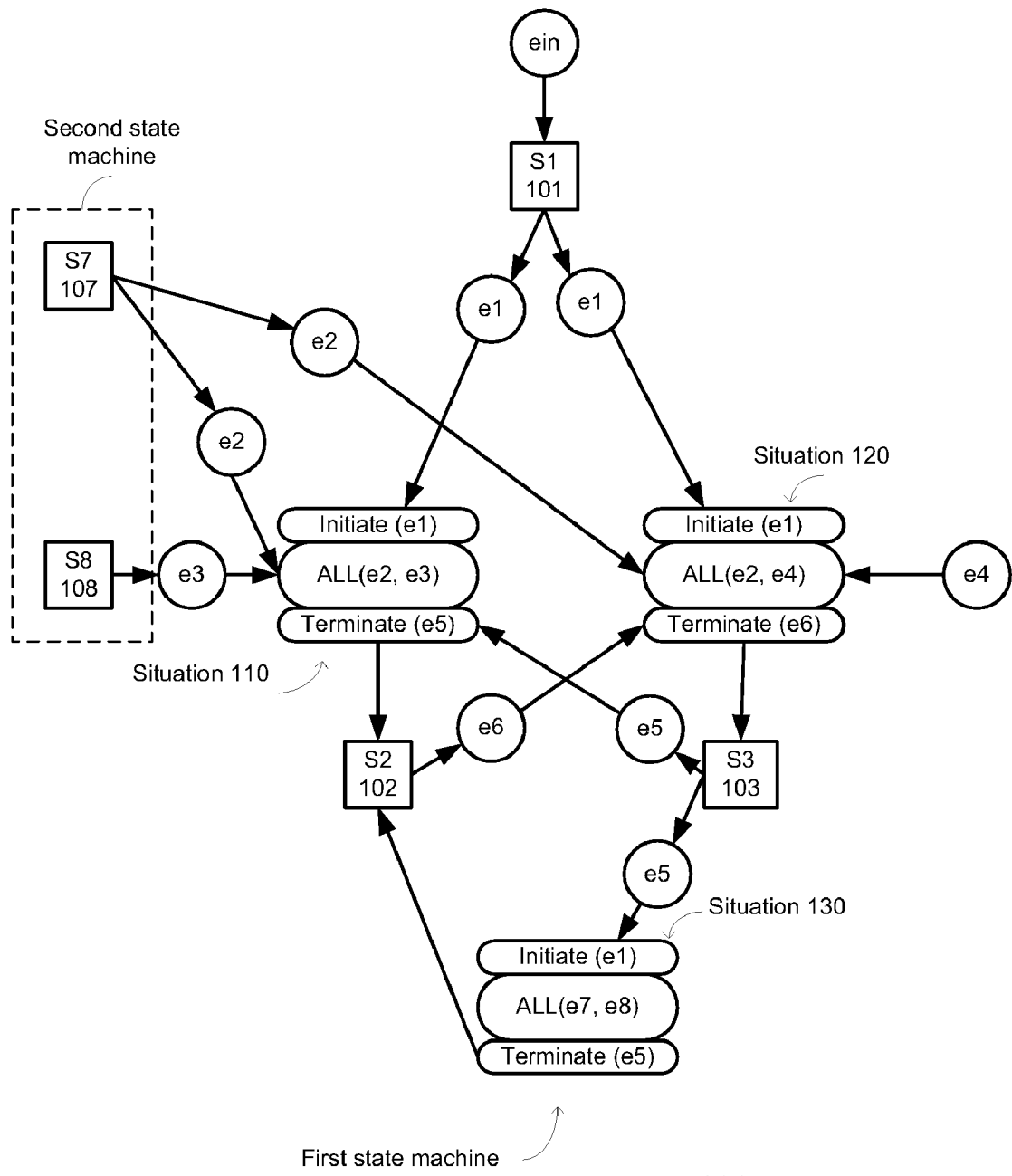
FIG. 1 is a block diagram that schematically shows details of a complex event processing model of a state machine, according to an embodiment of the invention.

FIG. 1 is a block diagram 100 that schematically shows details of a complex event processing model of a first state machine, according to an embodiment of the invention.

An initialization of the first state machine generates an initiating event ein, which causes the first state machine to enter a first state s1, as illustrated by node 101.

Node 101 generates an event e1 which initiates the life spans of situations 110 and 120. Situation 110 describes a transition of the state machine from first state s1 to second state s2. Situation 120 describes a transition of the state machine from first state S1 to third state S3.

Situation 110 triggers a transition to second state (s2, represented by node s2 102) if a second state machine enters its seventh state (s7, represented by node s7 107) and its eighth states (s8, represented by node s8 108) before the first state machine enters its third state (s3, represented by node s3 103). When the second state machine enters its seventh state s7 it triggers event e2 and when the second state machine enters its eighth state s8 it triggers event e3. When the first state machine enters its third state it triggers event e5.

In AMiT terminology, situation 110 is initiated by event e1, terminated by event e5 and can be expressed as ALL(e2, e3). The All operator means that the respective situation is detected (and the transition to state s2 occurs) if the operand events e2 and e3 arrive in any order during the lifespan of situation 110.

Situation 120 triggers a transition to third state s3 if a second state machine enters its seventh state s7 and if an external event e4 occurred before the first state machine enters its second state s2. When the first state machine enters its second state s2 event e6 is generated.

In AMiT terminology, situation 120 is initiated by event e1, terminated by event e6 and can be expressed as ALL(e2, e4). The All operator means that the respective situation is detected (and the transition to state s3 occurs) if the operand events e2 and e4 arrive in any order during the lifespan of situation 120.

Node 102 generates an event e5 which initiates the lifespan of situation 130 and terminates situation 110.

Situation 130 triggers a transition to second state s2 from the third state s3 if two events e7 and e8 occur. In AMiT terminology, situation 130 is initiated by event e5, terminated by event e6 and can be expressed as ALL(e7, e8). The All operator means that the respective situation is detected (and the transition to state s2 occurs) if the operand events e7 and e8 arrive in any order during the lifespan of situation 130.

Figure 2:
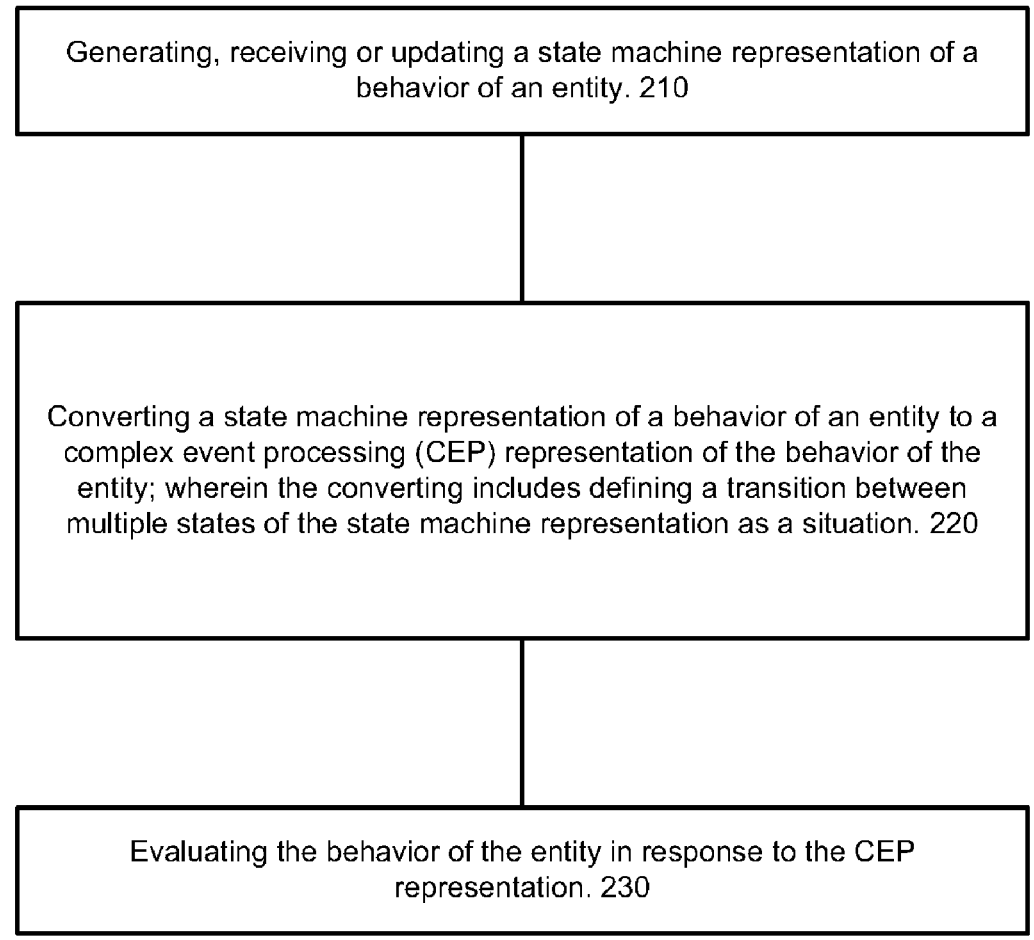
FIG. 2 is a flow chart of a method for evaluating a behavior of an entity, according to an embodiment of the invention.

FIG. 2 is a flow chart of method 200 for evaluating a behavior of an entity, according to an embodiment of the invention.

Method 200 starts by stage 210 of generating, receiving or updating a state machine representation of a behavior of an entity.

Stage 210 is followed by stage 220 of converting a state machine representation of a behavior of an entity to a complex event processing (CEP) representation of the behavior of the entity; wherein the converting includes defining a transition between multiple states of the state machine representation as a situation. FIG. 1 provides a result of a sample conversion.

The CEP engine can receive a definition of a situation that is responsive to various conditions. For example, a situation can be defined as an aggregation of data of multiple repetition of occurrence of a certain event and\or multiple events. Yet for another example, a situation can be defined as an absence of an occurrence of one or more events.

Conveniently, stage 220 includes at least one of the following operations, or a combination thereof: (i) Defining a lifespan of a situation in response to an ability to transit from one state to at least one other state, (ii) Defining a transition from a certain state of the entity to another state of the entity in response to occurrences of multiple events, (iii) Defining a transition from a certain state of the entity to another state of the entity in response to multiple repetitions of a certain event, (iv) Defining a lifespan of at least one situation in response to a state of another entity having its behavior modeled by another state machine; and (v) defining a lifespan of at least one situation in response to an event that includes occurrences external to a processor that participates in the evaluating.

Stage 220 is followed by stage 230 of evaluating the behavior of the entity in response to the CEP representation.

Conveniently, stage 230 includes evaluating the behavior of the entity in response to a behavior of another entity. The evaluating can involve invoking a CEP engine to process the CEP model. The CEP engine can be fed by information representative of a status of a state machine or events that trigger transitions from one state to another, and the CEP engine will determine which actions should be taken.

Conveniently, stage 230 includes: (i) receiving events (receiving information representative of an occurrence of events), the events can be generated by the CEP engine or received from external sources (optionally via adaptors), and (ii) evaluating the received events in response to the CEP representation in order to determine which situations can be affected, whether life spans can be initiated or terminated, which events can be generated by the CEP engine itself in response to the received events, and the like. The evaluating can include, for example, determining whether situation occurred, performing time based situation detection, determining that the entity state changes, and the like.

Figure 3:
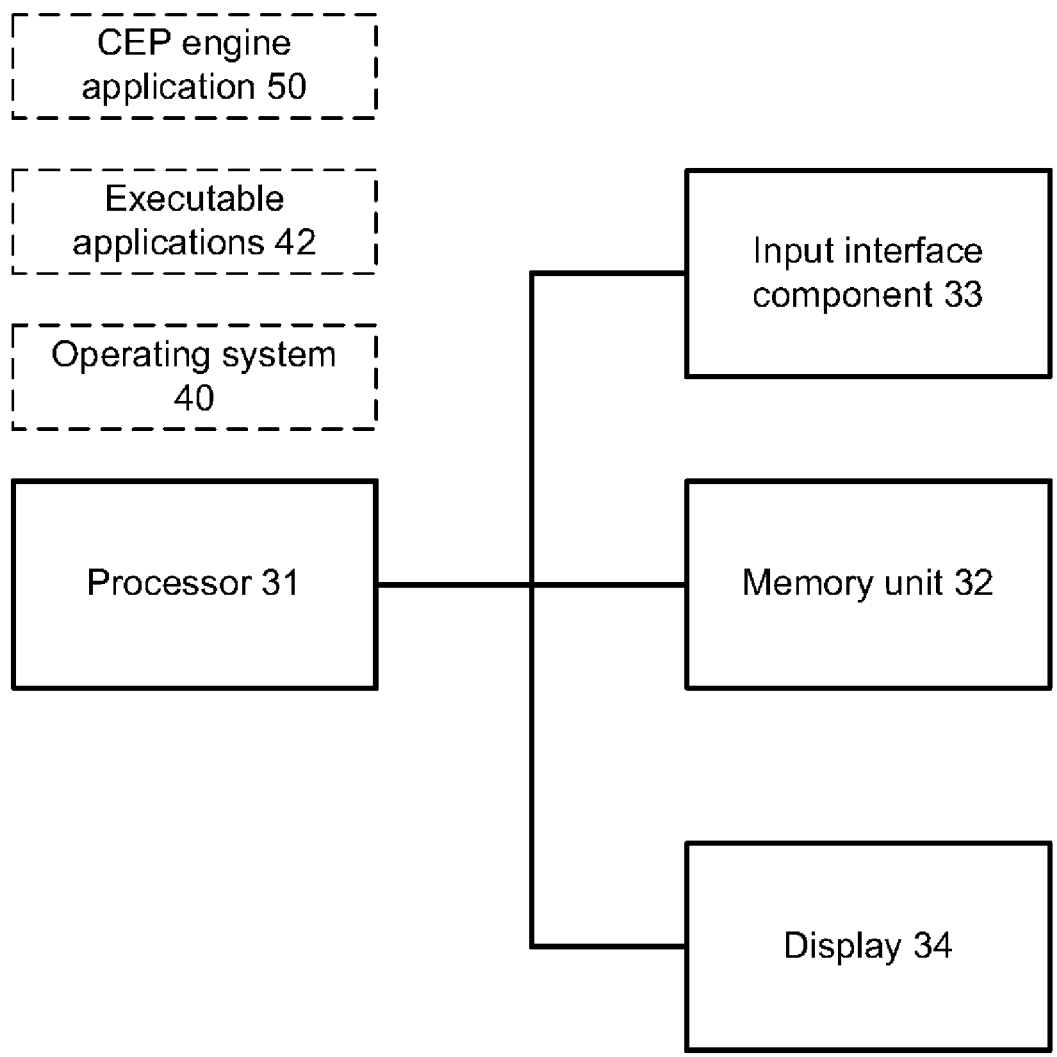
FIG. 3 illustrates a system for evaluating a behavior of an entity, according to an embodiment of the invention.

FIG. 3 illustrates system 10 for evaluating a behavior of an entity, according to an embodiment of the invention.

System 10 may represent practically any type of computer, computer system or other programmable electronic system. System 10 may be connected in a network or may be a stand-alone system in the alternative.

System 10 includes processor 31 that is connected to memory unit 32, user input interface component 33 and display 34. System 10 can be connected to other systems via wired and/or wireless links. It is noted that system 10 can be characterized by a centralized architecture but that it can also be characterized by a distributed architecture. Accordingly, the various components of system 10 can be located near each other, but this is not necessarily so.

User input interface component 33 can be a keyboard, a mouse, a joystick, a touchpad, a microphone, a gesture recognition system, or a combination thereof. It is noted that some of the mentioned above components such as user input interface component 33 and display 34 are optional, especially when system 10 should not be directly accessed by the user. For example, a host computer that is placed in a remote location does not necessarily include display 34.

According to a first embodiment of the invention, system 10 operates under the control of operating system 40, and executes various computer software applications, components, programs, objects, modules, etc., such as but not limited to executable programs 42 and CEP engine application 50.

Conveniently, system 10 can be controlled by multiple operating systems that in turn are monitored by a hypervisor. For simplicity of explanation FIG. 1 illustrates a single operating system.

Processor 31 is adapted to execute CEP engine application 50 and to: (i) convert a state machine representation of a behavior of an entity to a complex event processing (CEP) representation of the behavior of the entity; wherein the conversion includes defining a transition between multiple states of the state machine representation as a situation; and (ii) evaluate the behavior of the entity in response to the CEP representation.

Conveniently, processor 31 (when executing CEP engine application 50) is adapted to perform at least one of the following operations or a combination thereof: (i) define a lifespan of a situation in response to an ability to transit from one state to at least one other state, (ii) define a transition from a certain state of the entity to another state of the entity in response to occurrences of multiple events, (iii) define a transition from a certain state of the entity to another state of the entity in response to multiple repetitions of a certain event, (iv) detect a transition from one situation to the other and terminating a situation representative of the transition, and (v) define a lifespan of at least one situation in response to a state of another entity having its behavior modeled by another state machine; and wherein the evaluation is responsive to a behavior of the other entity.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium including a computer readable program, wherein the computer readable program when executed on a computer causes the computer to: convert a state machine representation of a behavior of an entity to a complex event processing (CEP) representation of the behavior of the entity; wherein the conversion includes defining a transition between multiple states of the state machine representation as a situation; and evaluate the behavior of the entity in response to the CEP representation.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for evaluating a behavior of an entity, the method comprising:
using a processor and a memory accessible to the processor in which computer program instructions are stored, wherein the instructions comprise distinct software modules including a complex event processing (CEP) engine, the processor operative under control of the instructions for:
modeling a behavior of the entity as a state machine representation thereof, the state machine representation comprising states, transitions between states, and actions of the entity;
converting the state machine representation of the behavior of the entity to a CEP model of the behavior of the entity; wherein the converting comprises defining a transition between multiple states of the state machine representation as a situation, and responsively to an occurrence of the transition generating an event in the CEP model that initiates a lifespan of the situation;
processing the CEP model in the CEP engine; and
responsively to processing the CEP model evaluating the behavior of the entity.

2. The method according to claim 1 wherein the stage of converting comprises defining a lifespan of a situation in response to an ability to transit from one state to at least one other state.

3. The method according to claim 1 wherein the stage of converting comprises defining a transition from a certain state of the entity to another state of the entity in response to occurrences of multiple events.

4. The method according to claim 1 wherein the stage of converting comprises defining a transition from a certain state of the entity to another state of the entity in response to multiple repetitions of a certain event.

5. The method according to claim 1 wherein the stage of evaluating comprises detecting a transition from one situation to the other and terminating a situation representative of the transition.

6. The method according to claim 1 wherein the stage of converting comprises defining a lifespan of at least one situation in response to a state of another entity having its behavior modeled by another state machine; and wherein the evaluating is responsive to a behavior of the other entity.

7. The method according to claim 1 wherein the stage of converting comprises defining a lifespan of at least one situation in response to an event that comprises occurrences external to a processor that participates in the evaluating.

8. A computer program product comprising a computer usable storage medium including a computer readable program, wherein the computer readable program when executed on a computer causes the computer to:
model a behavior of an entity as a state machine representation thereof, the state machine representation comprising states, transitions between states, and actions of the entity;
convert the state machine representation of the behavior of the entity to a complex event processing (CEP) representation of the behavior of the entity, wherein the conversion comprises defining a transition between multiple states of the state machine representation as a situation;
responsively to an occurrence of the transition generate an event in the CEP representation that initiates a lifespan of the situation;
thereafter process the CEP representation using a CEP engine application; and
responsively to processing the CEP representation evaluate the behavior of the entity in response to the CEP representation.

9. The computer program product according to claim 8, wherein the computer readable program when executed on a computer causes the computer to define a lifespan of a situation in response to an ability to transit from one state to at least one other state.

10. The computer program product according to claim 8, wherein the computer readable program when executed on a computer causes the computer to define a transition from a certain state of the entity to another state of the entity in response to occurrences of multiple events.

11. The computer program product according to claim 8, wherein the computer readable program when executed on a computer causes the computer to define a transition from a certain state of the entity to another state of the entity in response to multiple repetitions of a certain event.

12. The computer program product according to claim 8, wherein the computer readable program when executed on a computer causes the computer to detect a transition from one situation to the other and terminating a situation representative of the transition.

13. The computer program product according to claim 8, wherein the computer readable program when executed on a computer causes the computer to define a lifespan of at least one situation in response to a state of another entity having its behavior modeled by another state machine; and wherein the evaluating is responsive to a behavior of the other entity.

14. The computer program product according to claim 8, wherein the computer readable program when executed on a computer causes the computer to define a lifespan of at least one situation in response to an event that comprises occurrences external to a computer that participates in the evaluating.

15. A system comprising a memory unit coupled to a processor, wherein the processor is adapted to:
model a behavior of an entity as a state machine representation thereof, the state machine representation comprising states, transitions between states, and actions of the entity;
convert the state machine representation of the behavior of the entity to a complex event processing (CEP) representation of the behavior of the entity, wherein the conversion comprises defining a transition between multiple states of the state machine representation as a situation; and
responsively to an occurrence of the transition generate an event in the CEP representation that initiates a lifespan of the situation;
thereafter process the CEP representation using a CEP engine application; and
responsively to processing the CEP representation evaluate the behavior of the entity in response to the CEP representation.

16. The system according to claim 15 wherein the processor is adapted to define a lifespan of a situation in response to an ability to transit from one state to at least one other state.

17. The system according to claim 15 wherein the processor is adapted to define a transition from a certain state of the entity to another state of the entity in response to occurrences of multiple events.

18. The system according to claim 15 wherein the processor is adapted to define a transition from a certain state of the entity to another state of the entity in response to multiple repetitions of a certain event.

19. The system according to claim 15 wherein the processor is adapted to detect a transition from one situation to the other and terminating a situation representative of the transition.

20. The system according to claim 15 wherein the processor is adapted to define a lifespan of at least one situation in response to a state of another entity having its behavior modeled by another state machine; and wherein the evaluation is responsive to a behavior of the other entity.

* * * * *